(12) United States Patent
Eguchi

(10) Patent No.: US 10,382,651 B2
(45) Date of Patent: Aug. 13, 2019

(54) IMAGE PROCESSING DEVICE, IMAGE PROCESSING METHOD, IMAGE FORMING APPARATUS, AND IMAGE DISPLAY DEVICE

(71) Applicant: Konica Minolta, Inc., Chiyoda-ku, Tokyo (JP)

(72) Inventor: Munetoshi Eguchi, Tachikawa (JP)

(73) Assignee: KONICA MINOLTA, INC., Chiyodao-ku, Tokyo (JP)

( * ) Notice: Subject to any disclaimer, the term of this patent is extended or adjusted under 35 U.S.C. 154(b) by 0 days.

(21) Appl. No.: 15/795,147

(22) Filed: Oct. 26, 2017

(65) Prior Publication Data
US 2019/0132484 A1 May 2, 2019

(30) Foreign Application Priority Data

Nov. 18, 2016 (JP) ................................ 2016-224960

(51) Int. Cl.
*H04N 1/60* (2006.01)
*H04N 1/56* (2006.01)
*H04N 1/32* (2006.01)

(52) U.S. Cl.
CPC ........... *H04N 1/56* (2013.01); *H04N 1/32598* (2013.01); *H04N 2201/0082* (2013.01); *H04N 2201/0089* (2013.01)

(58) Field of Classification Search
None
See application file for complete search history.

(56) References Cited

U.S. PATENT DOCUMENTS

| 4,601,055 A * | 7/1986 | Kent .......................... G06T 1/20 348/671 |
| 2004/0064792 A1 | 4/2004 | Sugimoto |
| 2004/0159776 A1* | 8/2004 | Richard ........... H03K 19/00369 250/214 R |
| 2007/0070326 A1 | 3/2007 | Murata et al. |
| 2011/0228324 A1* | 9/2011 | Toyazaki .............. G06F 3/1211 358/1.15 |
| 2012/0137075 A1* | 5/2012 | Vorbach .................. G06F 9/526 711/122 |

FOREIGN PATENT DOCUMENTS

| CN | 102129838 A | 7/2011 |
| JP | 2000-225749 | 8/2000 |
| JP | 2010-204549 | 9/2010 |

OTHER PUBLICATIONS

Extended European Search Report dated Mar. 1, 2018, in European Patent Application No. 17200574.6, 9 pages.
First Office Action dated Mar. 21, 2019 for Chinese Patent Application No. 201711118644.0, with English translation, 19 pages.

* cited by examiner

*Primary Examiner* — Henok Shiferaw
(74) *Attorney, Agent, or Firm* — Squire Patton Boggs (US) LLP

(57) ABSTRACT

An image processing device includes a plurality of image processors cascaded into a plurality of stages, the image processors each performing image processing on image data received, wherein an image processor other than an image processor in the final stage performs image processing on image data being part of image data input, and transfers the remaining image data to an image processor in a subsequent stage.

20 Claims, 17 Drawing Sheets

IMAGE PROCESSING DEVICE, IMAGE PROCESSING METHOD, IMAGE FORMING APPARATUS, AND IMAGE DISPLAY DEVICE

Japanese Patent Application No. 2016-224960 filed on Nov. 18, 2016, including description, claims, drawings, and abstract the entire disclosure is incorporated herein by reference in its entirety.

BACKGROUND

Technological Field

The present invention relates to an image processing device which has a plurality of stages of image processors cascaded to process image data, an image processing method, an image forming apparatus, and an image display device.

Description of the Related Art

Image forming apparatuses, display devices, and the like which handle image data, use an image processing device having a plurality of image processors for processing images of respective colors. Such an image processing device has a plurality of image processors of the same kind which is cascaded and receives image data from an IC or the like, the image processors process the image data of respective colors, transfers a group of the image data to a subsequent stage, thus performing sequential processing. Therefore, the image processors are prepared for respective colors.

Furthermore, for transfer of the image data from the respective units, image signals of all colors have been transferred using image buses for parallel signals in image transfer, and each image processor selects, from all color data received, image data of a color to be output and processes the selected image data.

Devices cascaded to perform image processing are proposed for example, in JP 2010-204549 A. In JP 2010-204549 A, an image display device is proposed which includes an image generation unit outputting an image signal according to each row of one frame image data, and a DE signal validated in accordance with an image signal output time of one row and invalidated in accordance with the end of the output time, a plurality of control units cascaded to the image generation unit and each controlling the output of a DE signal to the downstream on the basis of an input DE signal, and a plurality of displays connected to the plurality of control units respectively.

However, a high resolution and high speed of recent image forming apparatuses require an increase in data volume to be transferred and a reduction in transfer time. The reduction in transfer time can be achieved by increasing the frequencies of the image buses, but the difficulty of adjusting timing between the parallel signals increases with increasing frequency, and the difficulty of adjusting timing and the difficulty of design have a trade-off relationship at a frequency of approximately 50 MHz. Furthermore, the number of bits can be also increased to achieve the high speed, but the number of terminals are increased, thereby raising the cost thereof.

In order to solve these problems, a clock-embedded high-speed differential serial signal represented by VbyOne (trade mark, hereinafter the same shall apply) has been employed for image buses in recent years. However, in the VbyOne, a serial signal has an upper limit transmission rate of 3.75 Gbps. Parallel signals before being converted to a serial signal is restricted to 5 Bytes (40 bits) per clock cycle, and an upper limit frequency is 75 MHz when 5 Bytes (40 bits) of data is transferred, and an upper limit frequency is 125 MHz when 3 Bytes (24 bits) of data is transferred. Therefore, when VbyOne is used to transfer all-color image data, image transfer may be delayed in comparison with conventional image transfer due to a trade-off relationship between a bus width of the parallel signals and the frequency. Accordingly, even if image data transfer is merely changed from parallel transfer to serial transfer, high-speed transfer cannot be fully achieved.

In JP 2010-204549 A, a DE signal of an effective image area is subjected to mask control, and an area where the DE signal is valid is determined to be an image to be output. Therefore, all images unnecessary to output are also transferred to a downstream device, thereby preventing efficient transfer.

SUMMARY

The present invention has been made in view of the above circumstances, and an object of the present invention is to provide an image processing device, an image processing method, an image forming apparatus, and an image display device in which when image processors are cascaded, only image data to be output in lower stages is transferred, achieving efficient transfer.

To achieve the abovementioned object, according to an aspect of the present invention, an image processing device reflecting one aspect of the present invention comprises a plurality of image processors cascaded into a plurality of stages, the image processors each performing image processing on image data received, wherein an image processor other than an image processor in the final stage performs image processing on image data being part of image data input, and transfers the remaining image data to an image processor in a subsequent stage.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
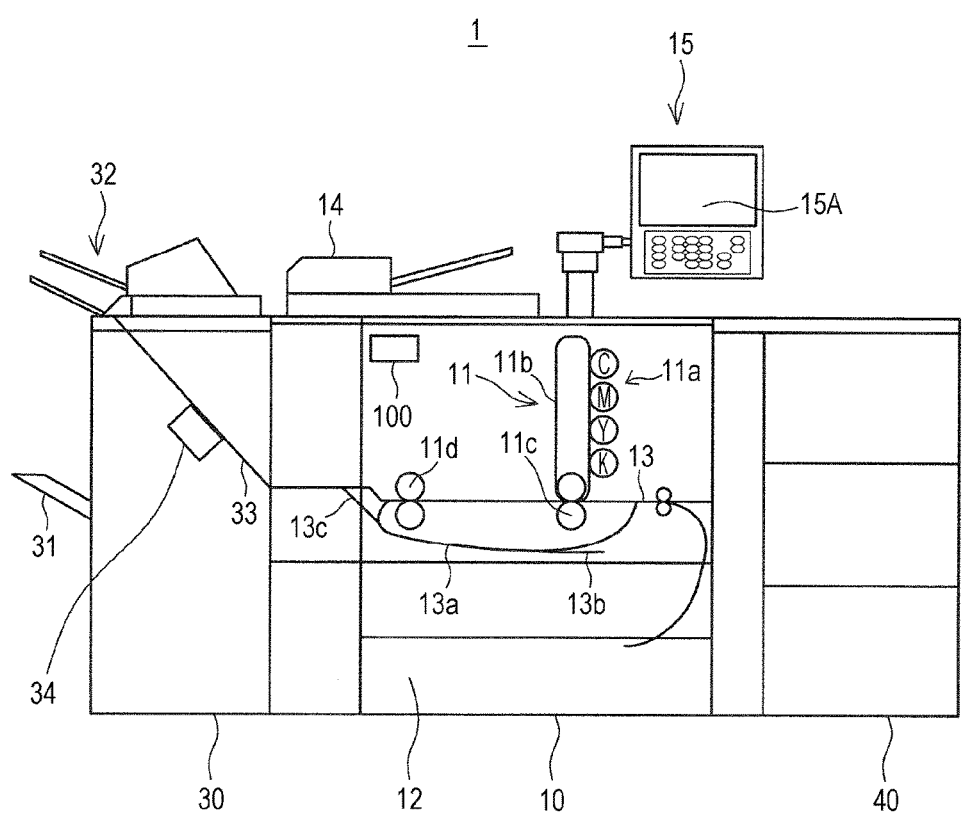
FIG. 1 is a mechanical schematic diagram of an image forming apparatus to which an image processing device according to an embodiment of the present invention is applied.

Hereinafter, one or more embodiments of the present invention will be described with reference to the drawings. However, the scope of the invention is not limited to the disclosed embodiments.

An image forming apparatus 1 according to the present embodiment includes a large-volume paper feeder 40 having a large-volume paper tray, an apparatus body 10, and a post-processing device 30, from the upstream side in a sheet conveyance direction, and the devices are continuously connected in the sheet conveyance direction. The large-volume paper feeder 40 can feed a paper sheet to the apparatus body 10.

In the present embodiment, the image forming apparatus are constituted by these devices. It should be noted that, in the present invention, the configuration of the image forming apparatus is not limited to this description, and the image forming apparatus may include the apparatus body 10 and the post-processing device 30, or the image forming apparatus may include only the apparatus body 10.

On the upper side of the apparatus body 10, an automatic document feeder (ADF) 14 is provided. An image of document fed by the automatic document feeder (ADF) 14 can be read by a scanner unit, not illustrated. Note that the document can be also read on an original glass plate, not illustrated.

On the upper side of the apparatus body 10, an operation unit 15 is further disposed. The operation unit 15 includes a touch panel LCD 15A, the LCD 15A is configured to display information and reception of operation, and in this embodiment, the touch panel LCD 15A is also used as an operation unit and a display. Note that the operation unit may include a mouse or a tablet and be configured separately from the display. Furthermore, the LCD 15A may be configured to be movable.

On the lower side of the apparatus body 10, a main body paper feeding unit 12 is disposed. The main body paper feeding unit 12 includes a plurality of main body paper trays each storing and feeding paper sheets. Furthermore, the large-volume paper feeder 40 additionally provided at the apparatus body 10 includes a plurality of the large-volume paper trays each storing paper sheets and feeding the paper sheets to the apparatus body 10.

On the inside of the apparatus body 10, a conveyance path 13 is provided. The conveyance path 13 conveys a paper sheet fed from the main body paper feeding unit 12 or the large-volume paper feeder 40, and is connected to a conveyance path 33 of the post-processing device 30.

On the way to the conveyance path 13 of the apparatus body 10, an image former 11 is provided. The image former 11 includes a photoreceptor 11a for each color (cyan (C), magenta (M), yellow (Y), black (K)), and a charging device, an LD, and a developing device, which are not illustrated, are provided around each photoreceptor 11a. Furthermore, the image former 11 includes an intermediate transfer belt 11b on which an image on the photoreceptor 11a is transferred, and a secondary transfer unit 11c which transfers an image on the intermediate transfer belt 11b to a paper sheet.

In the conveyance path 13 positioned on the downstream side from the secondary transfer unit 11c, a fuser 11d is disposed.

The image former 11 is constituted by the photoreceptor 11a, the charging device, the LD, the developing device, which are not illustrated, the intermediate transfer belt 11b, the secondary transfer unit 11c, the fuser 11d, and the like. Note that the image former forming a monochrome image may be employed. The image former printing only a monochrome image may be employed.

Furthermore, the conveyance path 13 includes a reversing path 13a branched from a straight portion of the conveyance path 13 on the downstream side from the fuser 11d. A downstream conveyance path 13c is branched from the reversing path 13a, and a retracted conveyance path 13b is branched on the downstream side from the downstream conveyance path 13c. On the downstream side from the retracted conveyance path 13b, the reversing path 13a is confluent with the conveyance path 13 on the upstream side from the image former 11.

When only a face side of a paper sheet conveyed to the reversing path 13a is changed to the other side, the paper sheet is once fed to the retracted conveyance path 13b, and then fed backward to the downstream conveyance path 13c. The downstream conveyance path 13c is confluent with the conveyance path 13 on the downstream side in the conveyance direction. The paper sheet, the face side of which is changed, to be fed to the downstream conveyance path 13c is fed to the downstream side through the conveyance path 13.

When a paper sheet is returned to the image former 11, the paper sheet once fed from the reversing path 13a to the retracted conveyance path 13b is fed backward to the reversing path 13a on the downstream side, and then fed to the conveyance path 13 on the upstream side of the image former 11 to form an image on the back side of the paper sheet.

The apparatus body 10 includes an image processing device 100 in which image data is input from a CPU and appropriate image processing is performed on the image data. The image processing includes frequency conversion, color adjustment, density adjustment, screening, or the like. The image data obtained after the image processing by the image processing device 100 is used to be written to form an image on a paper sheet in the image former 11. Note that in the present invention, the contents of the processing in the image processing device is not limited to specific processing.

Furthermore, the image processing device 100 may handle image data for the display to output the image data to the display. In this configuration, the display corresponds to an image display device according to the present invention.

The post-processing device 30 is connected on the downstream side from the apparatus body 10, and the downstream side of the conveyance path 13 of the apparatus body 10 is connected to the conveyance path 33 of the post-processing device 30.

The conveyance path 33 is branched to be connected to a first paper output unit 31 and a second paper output unit 32, and a post-processing unit 34 is provided on the conveyance path 33 leading to the second paper output unit 32. The post-processing unit 34 performs predetermined post-processing. The post-processing includes appropriate processing such as stapling, punching, or binding. A paper sheet subjected to no post-processing is output to the first paper output unit 31.

A paper sheet fed through the conveyance path 13 is sent to the conveyance path 33 of the post-processing device 30, and then the paper sheet is output to the first paper output unit 31 without the post-processing or output to the second paper output unit 32 after predetermined post-processing at the post-processing unit 34. The post-processing unit 34 may perform a plurality of post-processing procedures.

Figure 2:
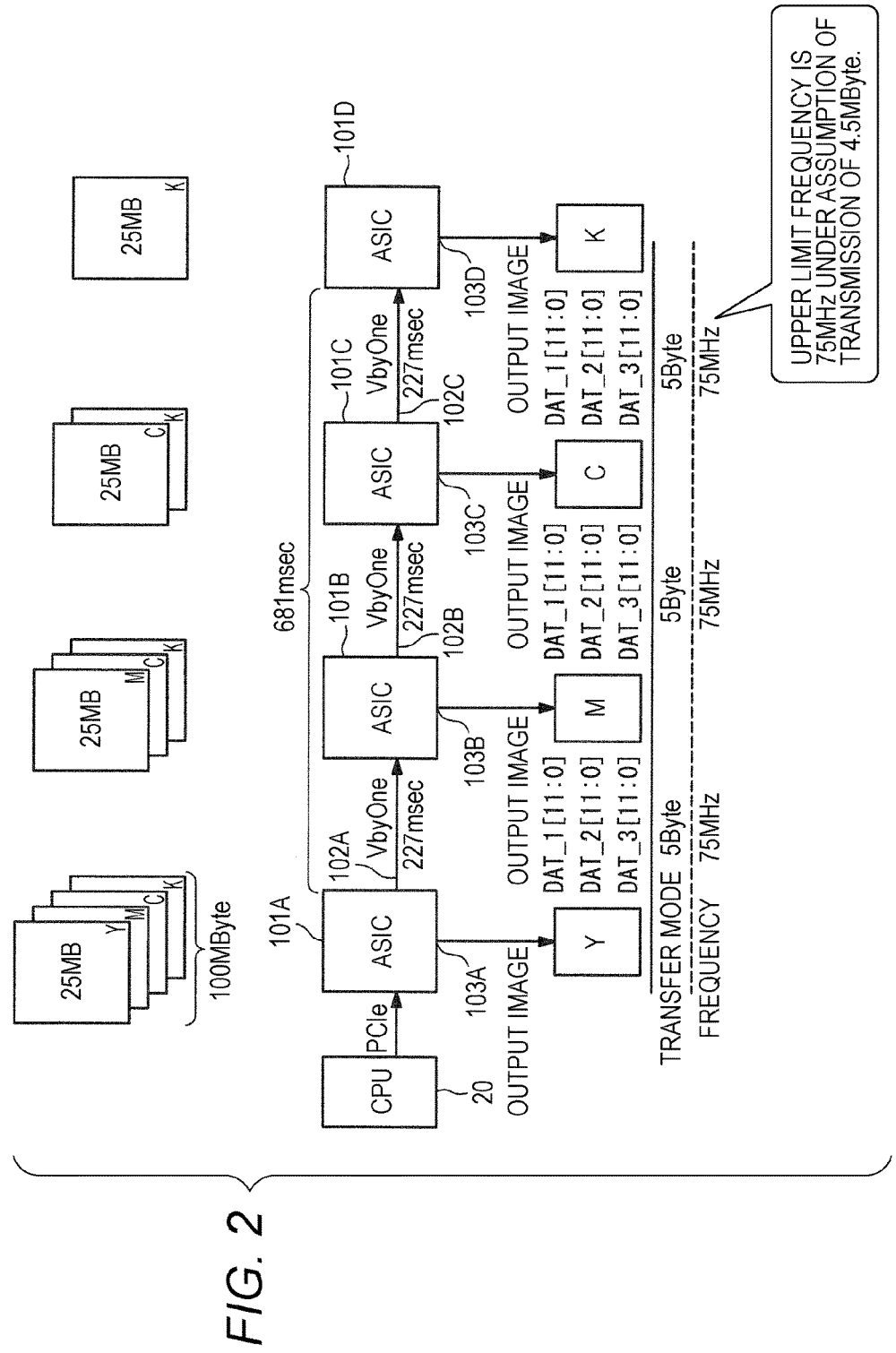
FIG. 2 is a block diagram of an image processing device according to an embodiment (Embodiment 1-1) of the present invention.

Next, a block diagram of an image processing device 100 is illustrated in FIG. 2.

A CPU 20 may be a CPU handling image data to control the whole image forming apparatus 1 or may be a CPU handling data.

The image processing device 100 includes an ASIC 101A in the first stage which is connected to the CPU 20 through a PCI Express (PCIe). The ASIC 101A has a transfer bus 102A to which an ASIC 101B in a next stage is connected. The ASIC 101B has a transfer bus 102B to which an ASIC 101C in a next stage is connected, and the ASIC 101C has a transfer bus 102C to which an ASIC 101D in the final stage is connected. The ASICs in respective stages correspondingly include output ends 103A, 103B, 103C, and 103D to output processed image data. Note that the ASIC in the final stage is preferably in the final stage of processing, and a subsequent ASIC performing no further processing may be connected to the ASIC 101D.

The image processing device 100 includes, excluding the CPU 20, the ASICs 101A, 101B, 101C, and 101D and the transfer buses 102A, 102B, and 102C connecting between the respective ASICs.

The ASICs in respective stages are connected through a clock-embedded interface having VbyOne, enabling serial transfer. Note that in the present invention, connection between the ASICs is not limited to the clock-embedded interface. The ASICs 101A, 101B, 101C, and 101D correspond to image processors of the present invention. Furthermore, in the present embodiment, the ASICs 101A, 101B, 101C, and 101D have the same configuration.

Each of the image processors is constituted by an application specific LSI (integrated circuit) having a logic circuit performing a predetermined operation. However, in the present invention, the configuration of the image processor is not limited to the above configuration, the image processor preferably has a configuration enabling image data processing, output of processed image data, and transfer of unprocessed image data to an image processor in a subsequent stage, a circuit to be used may be any of a digital circuit and an analog circuit, and the CPU executing a program may be operated to perform processing.

Furthermore, ASICs in embodiments, which are described later, enable changing a transfer bus (the number of bytes to be transferred, transfer frequency), performing bus expansion by using an unused bus.

Figure 17:
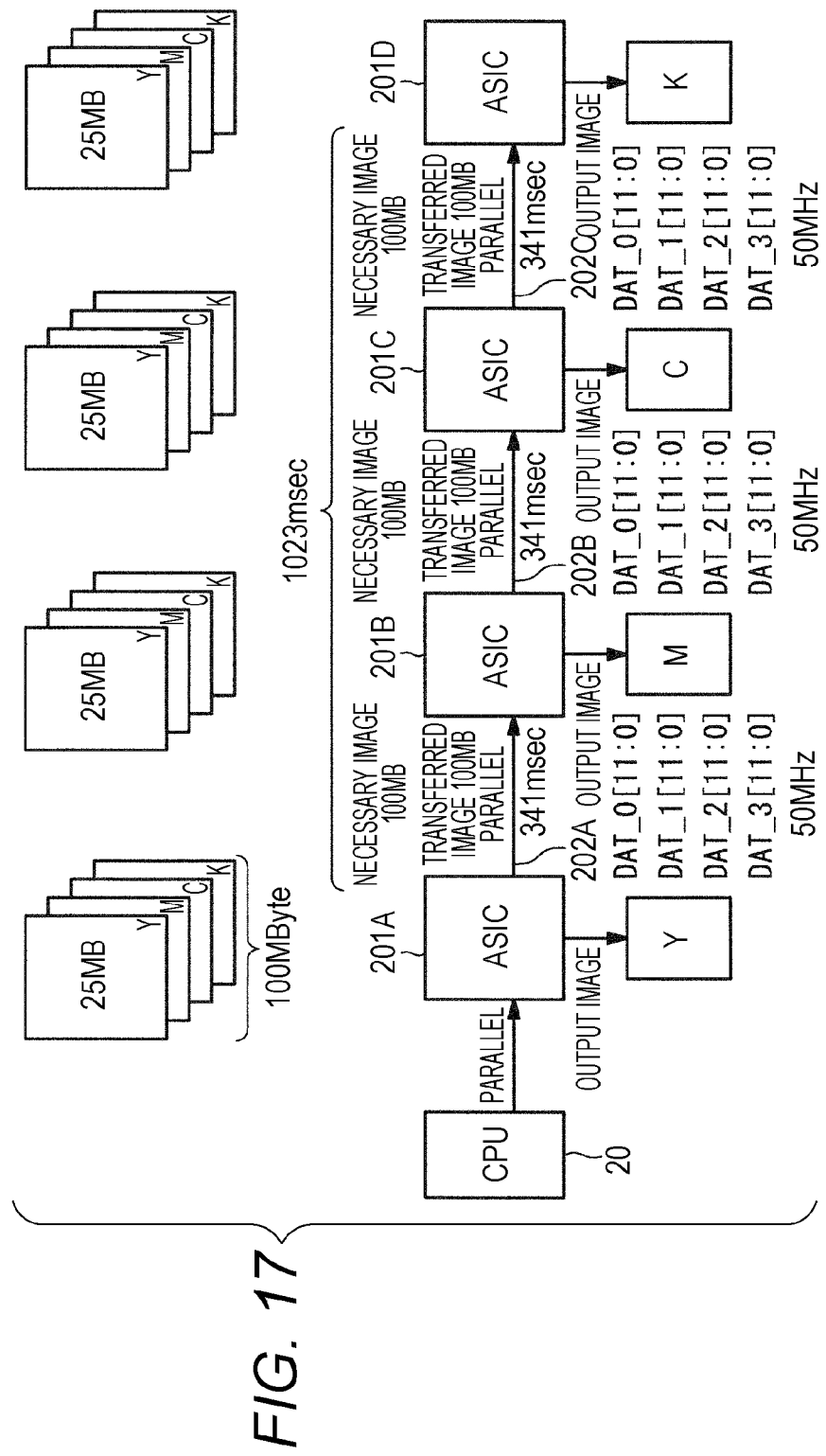
FIG. 17 is a block diagram of a conventional image processing device.

An image processing device of a conventional example performs an image transfer process in which all-color (four-color) image data generated by the CPU 20 is firstly transferred to a first ASIC 201A (output image processing device), as illustrated in FIG. 17. The first ASIC 201A (output image processing device) receives the data at an input terminal (image bus) and stores the data in an internal memory. A cascade output terminal is mounted to the ASIC 201A to transfer the all-color (four-color) image data to a second ASIC 201B (output image processing device) through an image bus 202A. The second ASIC 201B (output image processing device) receives the image data at an input terminal, similarly to the first ASIC 201A, and stores the image data in an internal memory, as in the first ASIC 201A (output image processing device). The same operation is repeated to the fourth device. That is, the all-color (four-color) image data is transferred to an ASIC 201C from the ASIC 201B through an image bus 202B, and the all-color (four-color) image data is transferred to an ASIC 201D from the ASIC 201C through an image bus 202C. Each ASIC (output image processing device) selects a color necessary to output an image to an engine unit.

This basic configuration enables cascade connection, the cascade connection eliminates the need for direct connection to the CPU, and the number of terminals can be reduced in the CPU. Furthermore, the output image processing device only needs to perform processing of a single-color image and outputting of the single-color image to the engine, thus preventing a circuit size as well.

A transfer time will be described. It is assumed that parallel signals (image bus) of four colors and 48 bits (12 bits per color) connect the devices to each other to transfer an image. Furthermore, it is assumed that a transfer frequency is 50 MHz, which is substantially the upper limit of the frequency, and single-color image data is 25 Mbytes. According to the assumptions described above, transfer between devices takes 341 msec, and thus it takes 1023 msec to transfer the image data from the start of output from the first device to the completion of the input to the fourth device.

Next, the operation contents of the image processing device 100 will be described.

As a basic configuration, a plurality of output image processing devices (ASICs) is cascaded, and one output image processing device (ASIC) outputs single-color image data to the engine unit, as described above.

Embodiment 1-1

Next, the operation contents of the image processing device according to an embodiment of the present invention will be described.

In Embodiment 1, as illustrated in FIG. 2, the ASICs are connected to each other through VbyOne. Since an image bus has an upper limit, a device achieves a configuration in which all-color image data is not transferred between the ASICs but image data having colors necessary to downstream devices is transferred.

Specifically, all-color (four-color) image data generated by the CPU 20 is firstly transferred to the first ASIC 101A. The first ASIC 101A receives the data at an input terminal (image bus), stores the data in an internal memory, and performs image processing on single-color image data. Processed image data is output from the output end. A cascade output terminal is mounted to the ASIC 101A to transfer unprocessed three-color image data where the single-color image data is eliminated to the second ASIC 101B through an image bus 102A. The second ASIC 101B receives the image data at an input terminal, similarly to the first ASIC 101A, stores the image data in an internal memory, as in the first ASIC 101A, and performs image processing on single-color image data.

Unprocessed two-color image data in which the single-color data is further eliminated is transferred from the second ASIC 101B to the third ASIC 101C through the transfer bus 102B. The third ASIC 101C receives the image data at an input terminal, similarly to the second ASIC 101B, stores the image data in an internal memory, as in the first ASIC 101A, and performs image processing on single-color image data. A cascade output terminal is mounted to the ASIC 101C to transfer unprocessed single-color image data to the fourth ASIC 101D through an image bus 102C.

The fourth ASIC 101D receives the image data at an input terminal, similarly to the third ASIC 101C, stores the image data in an internal memory, as in the first ASIC 101A, and performs image processing on single-color image data As described above, three-color image data is transferred from the first ASIC 101A to the second ASIC 101B through the image bus 102A, two-color image data is transferred from the second ASIC 101B to the third ASIC 101C through an image bus 102B, and single-color image data is transferred from the third ASIC 101C to the fourth ASIC 101D through the image bus 102C.

Since image data of up to three colors are transferred between the ASICs, the image bus is 36 bits. Since the transfer mode of VbyOne is a 5 ByteMode, the upper limit of frequency is 75 MHz. The transfer time of 1023 msec in the conventional example can be reduced to a transfer time of 681 msec, as illustrated in FIG. 2. In the ASICs, the processed image data is output to an image engine unit from the respective output ends 103A, 103B, 103C, and 103D.

In Embodiment 1-1, images to be transferred are restricted to only images of colors necessary to downstream devices, but the image bus transfers data without changing assignment of 12 bits per color, with changing only a physical layer, and therefore, the cascade and the transfer of images can be achieved by an image bus configuration closer to that of the conventional example. The number of terminals can be considerably reduced from 49 parallel terminals to two serial terminals.

Note that in transfer between ASICs, each transfer time is determined by transfer modes or transfer frequencies set in the respective ASICs.

Embodiment 1-2

Figure 3:
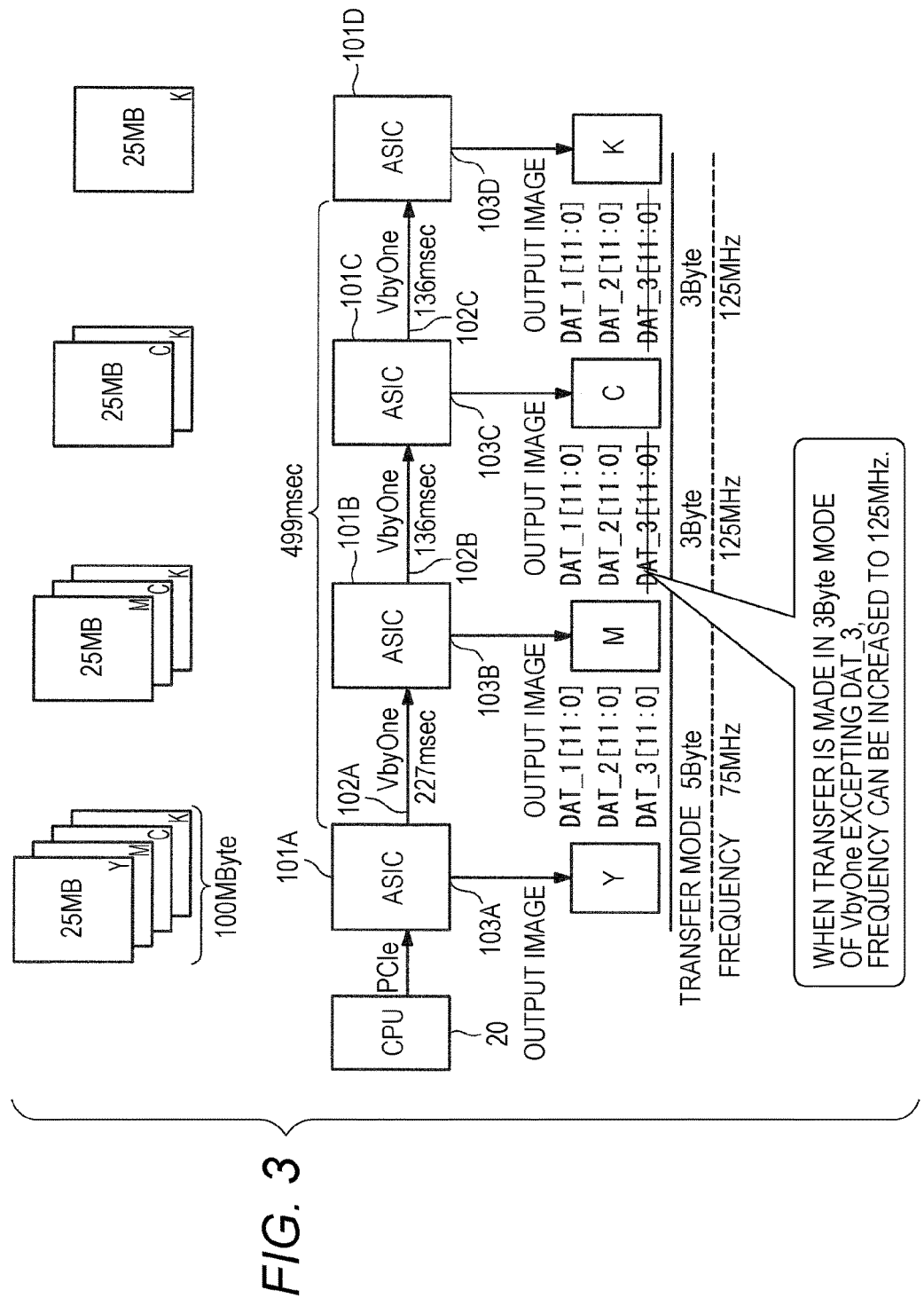
FIG. 3 is a block diagram of an image processing device according to another embodiment (Embodiment 1-2) of the present invention.

Embodiment 1-2 is different from Embodiment 1-1 in which the transfer time is reduced by changing the transfer mode of VbyOne, as illustrated in FIG. 3.

The ASIC 101A in the first stage of the image processing device 100 is connected to the CPU 20 through the PCIe, and the ASIC 101B in a next stage is connected to the transfer bus 102A of the ASIC 101A. The ASIC 101C in a next stage is connected to the transfer bus 102B of the ASIC 101B, and the ASIC 101D in the final stage is connected to the transfer bus 102C of the ASIC 101C. The ASICs in respective stages correspondingly include the output ends 103A, 103B, 103C, and 103D to output processed image data.

Since two-color image data is only required to be transferred from the second ASIC 101B to the third ASIC 101C, the image bus transfers 24 bits per clock cycle. The image bus extending from the first ASIC 101A to the second ASIC 101B transfers 40 bits per clock cycle, and between the second stage and the third stage, the number of bytes to be transferred is smaller than that in the transfer of 40 bits.

Furthermore, 3 ByteMode can be selected for the transfer mode of VbyOne, and the upper limit frequency is 125 MHz. From the first ASIC 101A to the second ASIC 101B, transfer is performed at a transfer frequency of 75 MHz, but from the second ASIC 101B to the third ASIC 101C, and from the third ASIC 101C to the fourth ASIC 101D, the transfer frequency of VbyOne is increased to 125 MHz. The above configuration can reduce the transfer time to 499 msec. Note that in the ASICs 101A to 101D, as in the embodiment described above, processed image data is output from the respective output ends 103A to 103D to the image engine unit.

Note that in transfer between ASICs, a transfer bus can be changed by transfer modes or transfer frequencies set in the respective ASICs, and each transfer time is determined.

Embodiment 1-3

Figure 4:
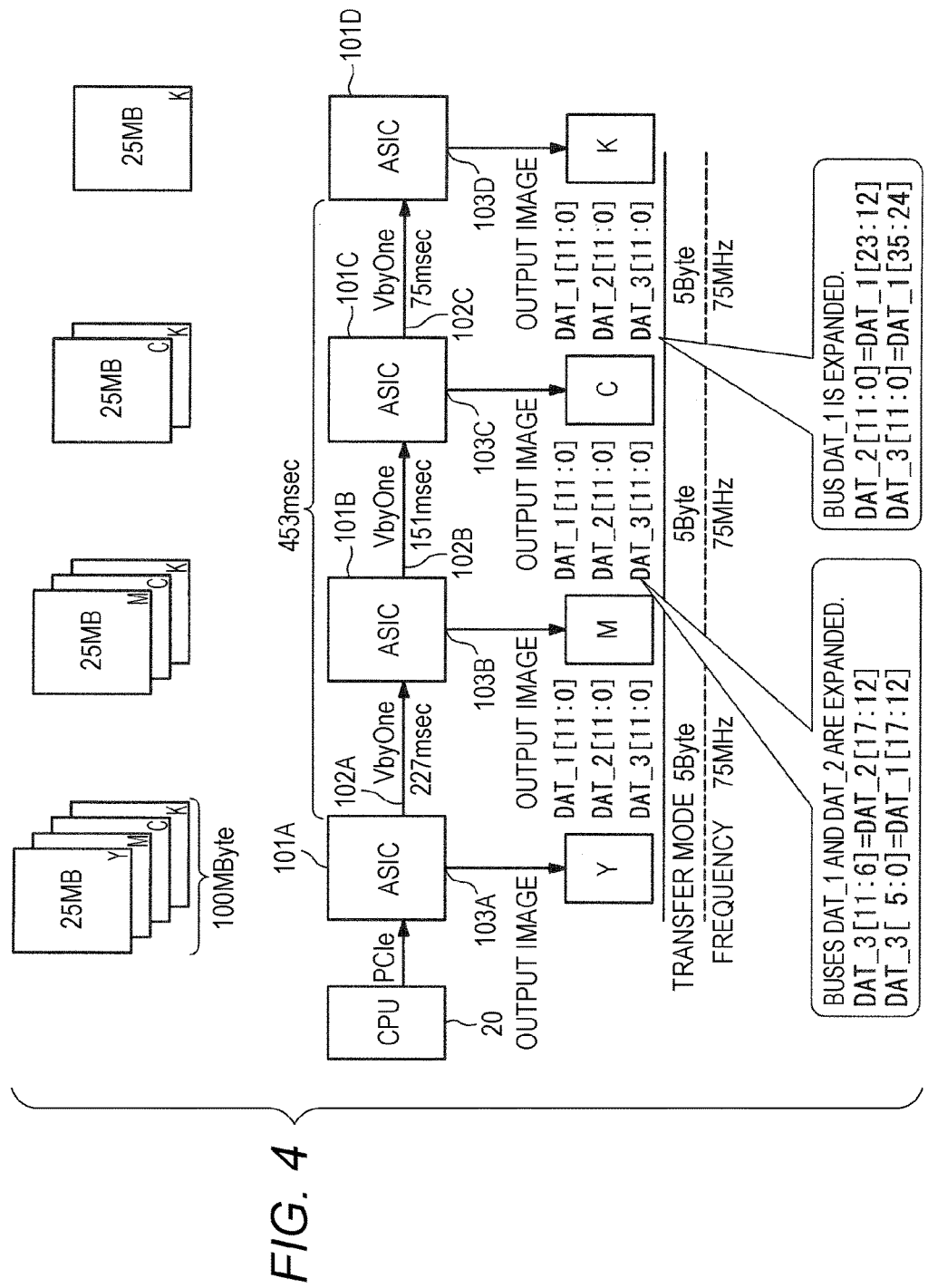
FIG. 4 is a block diagram of an image processing device according to another embodiment (Embodiment 1-3) of the present invention.

Embodiment 1-3 is different from Embodiment 1-1 in which an unused image bus (unused bus) is used to reduce the transfer time, as illustrated in FIG. 4. Unlike Embodiment 1-2, the transfer mode of VbyOne is not changed (the same as that in Embodiment 1-1).

The ASIC 101A in the first stage of the image processing device 100 is connected to the CPU 20 through the PCIe, and the ASIC 101B in a next stage is connected to the transfer bus 102A of the ASIC 101A. The ASIC 101C in a next stage is connected to the transfer bus 102B of the ASIC 101B, and the ASIC 101D in the final stage is connected to the transfer bus 102C of the ASIC 101C. The ASICs in respective stages correspondingly include the output ends 103A, 103B, 103C, and 103D to output processed image data.

Between the ASICs 101A to 101D, three image buses DAT_1, DAT_2, and DAT_3 are provided. In Embodiment 1-2, when two-color image data is transferred from the second ASIC 101B to the third ASIC 101C, and when single-color image data is transferred from the third ASIC 101C to the fourth ASIC 101D, DAT_3 is not used.

In this embodiment, in transfer through the transfer buses 102B and 102C, the bus DAT_3 is used to expand the image bus to increase a data rate per CLK from 12 bits per color to 18 bits per color. That is, when two-color image data is transferred from the second ASIC 101B to the third ASIC101C, the buses DAT_1 and DAT_2 are expanded to provide relationships DAT_3(11:6)=DAT_2(17:12) and DAT_3(5:0)=DAT_1(17:12).

When single-color image data is transferred from the third ASIC 101C to the fourth ASIC 101D, the buses DAT_2 and DAT_3 are used to expand the image bus to increase a data rate per CLK to 36 bits per color. That is, the bus DAT_1 is expanded to provide relationships DAT_2(11:0)=DAT_1(23:12) and DAT_3(11:0)=DAT_1(35:24).

According to this embodiment, the configuration of the image bus can be optimized to reduce the transfer time to 453 msec. Note that in the ASICs 101A to 101D, as in the embodiments described above, processed image data is output from the respective output ends 103A to 103D to the image engine unit.

Note that in transfer between ASICs, each transfer time is determined by transfer modes, transfer frequencies, the number of buses, or the like set in the respective ASICs.

Embodiment 1-4

Figure 5:
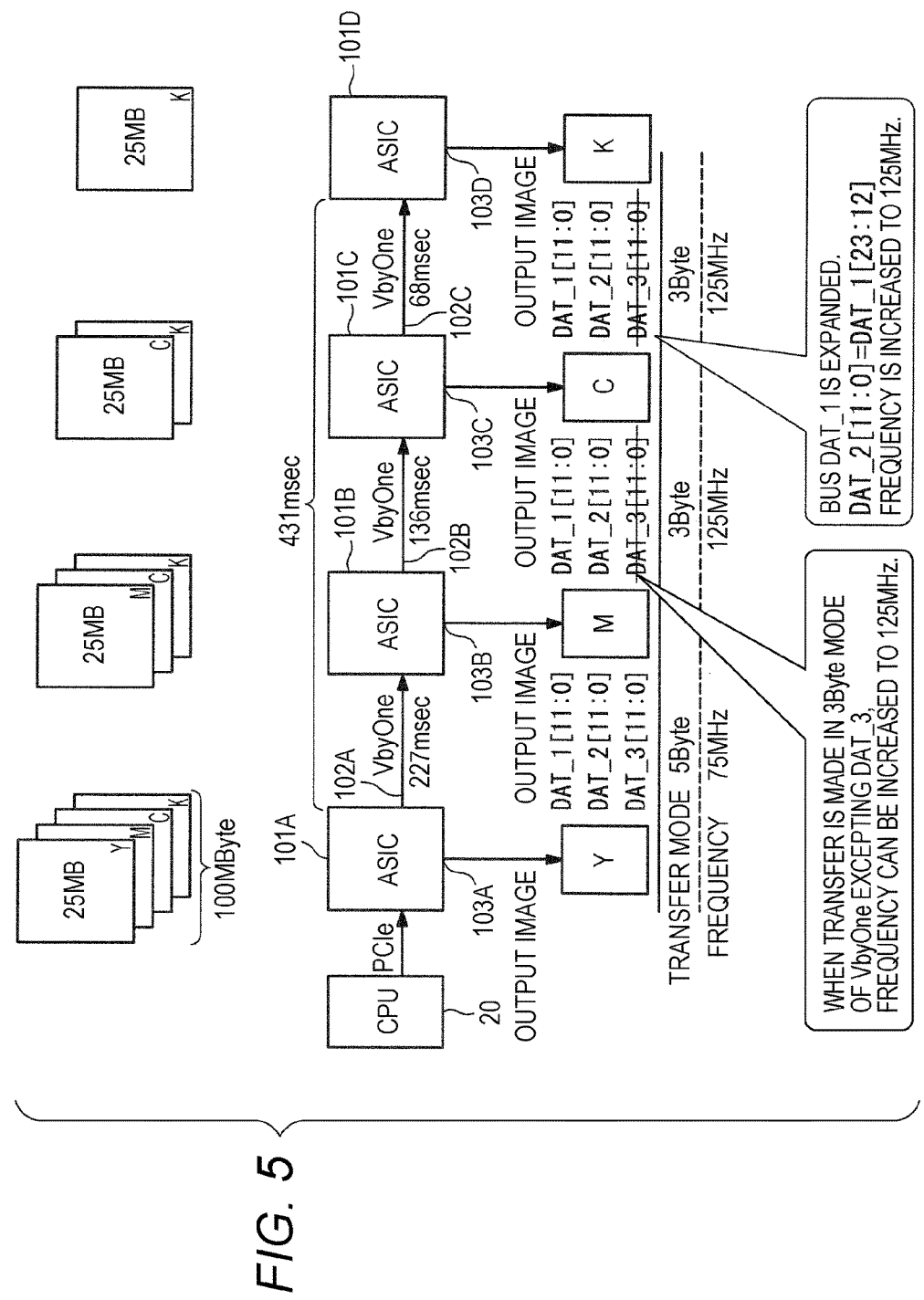
FIG. 5 is a block diagram of an image processing device according to another embodiment (Embodiment 1-4) of the present invention.

In Embodiment 1-4, as illustrated in FIG. 5, Embodiment 1-2 and Embodiment 1-3 can be combined and used to further reduce the transfer time.

In this embodiment, the ASIC 101A in the first stage of the image processing device 100 is connected to the CPU 20 through the PCIe, and the ASIC 101B in a next stage is connected to the transfer bus 102A of the ASIC 101A. The ASIC 101C in a next stage is connected to the transfer bus 102B of the ASIC 101B, and the ASIC 101D in the final stage is connected to the transfer bus 102C of the ASIC 101C. The ASICs in respective stages correspondingly include the output ends 103A, 103B, 103C, and 103D to output processed image data.

When Embodiment 1-2 (499 msec) and Embodiment 1-3 (453 msec) are compared with each other, the total transfer time is reduced in Embodiment 1-3. However, when Embodiment 1-2 and Embodiment 1-3 are compared with each other in terms of transfer between ASICs, the transfer time is shorter when transferring 24 bit at 125 MHz (136 msec) through the image bus, than when transferring 36 bit at 75 MHz (227 msec) through the image bus. Therefore, between the second ASIC 101B and the third ASIC 101C, the transfer mode of VbyOne is set to 3 ByteMode, and between the third ASIC 101C and the fourth ASIC 101D, transfer per CLK through the image bus is set to 24 bits per color and a transfer frequency is set to 125 MHz. Furthermore, between the third ASIC 101C and the fourth ASIC 101D, the transfer mode of VbyOne is set to 3 ByteMode, and the transfer frequency is set to 125 MHz. At this time, the bus DAT_1 is expanded to satisfy a relationship DAT_2 (11:0)=DAT_1(23:12).

The above configuration can reduce the transfer time to 431 msec. In the ASICs 101A to 101D, as in the embodiments described above, processed image data is output from the respective output ends 103A to 103D to the image engine unit.

Embodiment 2-1

Figure 6:
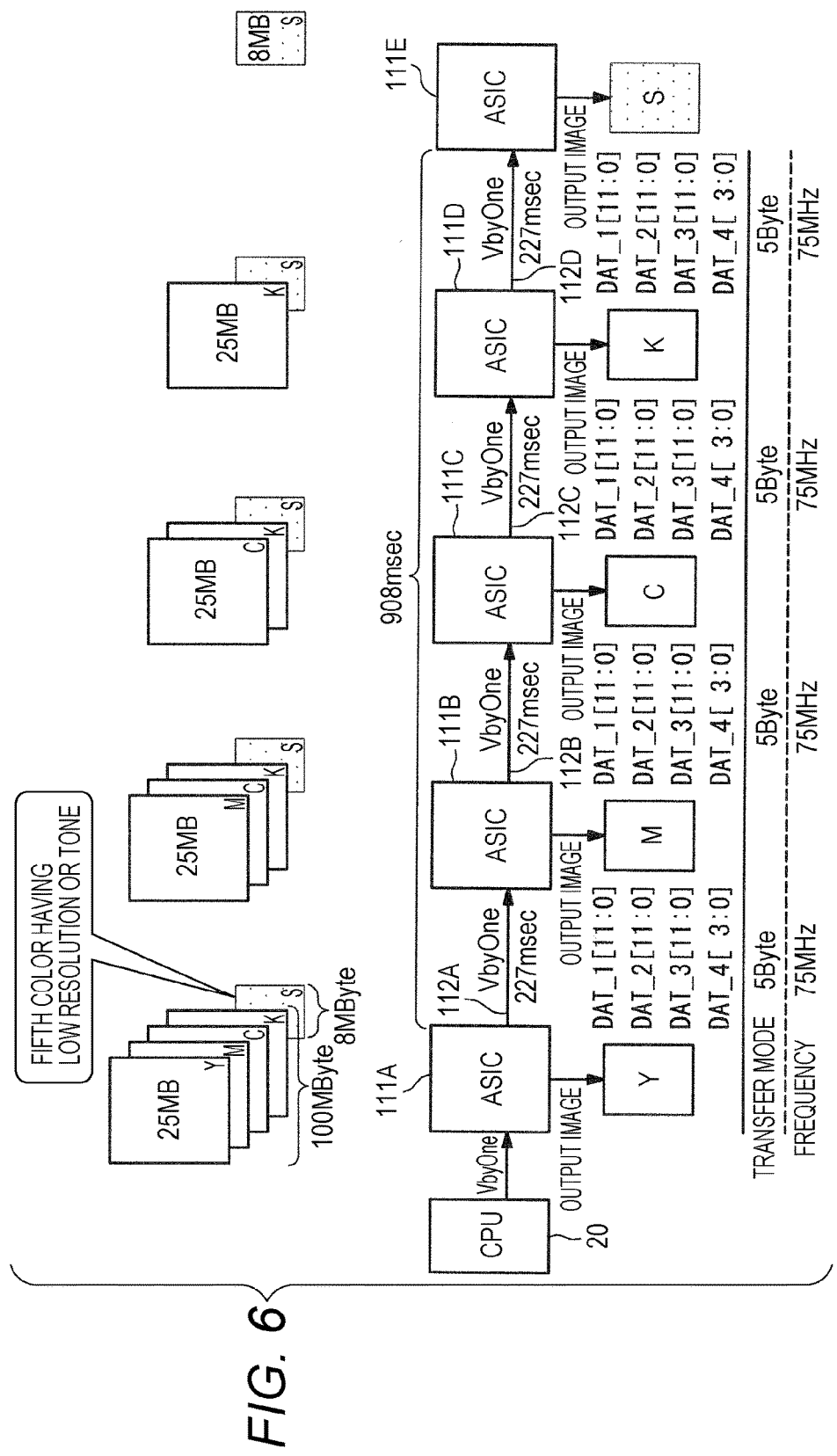
FIG. 6 is a block diagram of an image processing device according to another embodiment (Embodiment 2-1) of the present invention.

In Embodiment 2-1, as illustrated in FIG. 6, five image processors are cascaded to output an image having a fifth color from the fifth image processor. The fifth color is also referred to as a spot color (S in FIG. 6), and an image having the fifth color sometimes has a resolution or tone lower than that of CMYK colors. Note that the number of the image processors to be cascaded is not particularly limited as described above, and the number of the image processors can be selected when needed.

In this embodiment, an ASIC 111A, an ASIC 111B, an ASIC 111C, an ASIC 111D, and an ASIC 111E are sequentially connected to the CPU 20 in this order from an upper stage closer to the CPU 20, by the clock-embedded interface including VbyOne, and serial transfer can be performed between the ASICs through transfer buses 112A, 112B, 112C, and 112D.

In Embodiments 1-1 and 1-3, between the first ASIC 101A and the second ASIC 101B, 36 bits of three-color image data is transferred through the transfer bus 102A, but 5 ByteMode of VbyOne enables transferring 40 bits, and remaining 4 bits are not used. Therefore, an image having a low resolution or tone can be transferred. From the description described above, in Embodiment 2-1, a configuration is described to transfer image data of the fifth color having a low resolution or tone (small image size).

In Embodiment 2-1, the fifth color has a tone of ⅓ of CMYK, and has an image size/volume of approximately ⅓ (8 Mbytes). A bus for the fifth color is provided by adding 4 bits to DAT_4(3:0). A transfer completion time up to the fifth ASIC is 908 msec.

In Embodiment 2-1, as in Embodiment 1-1, the ASICs in the first to fourth stages are configured so that single-color image data is processed and then the remaining unprocessed image data is transferred to the downstream side.

Embodiment 2-2

Figure 7:
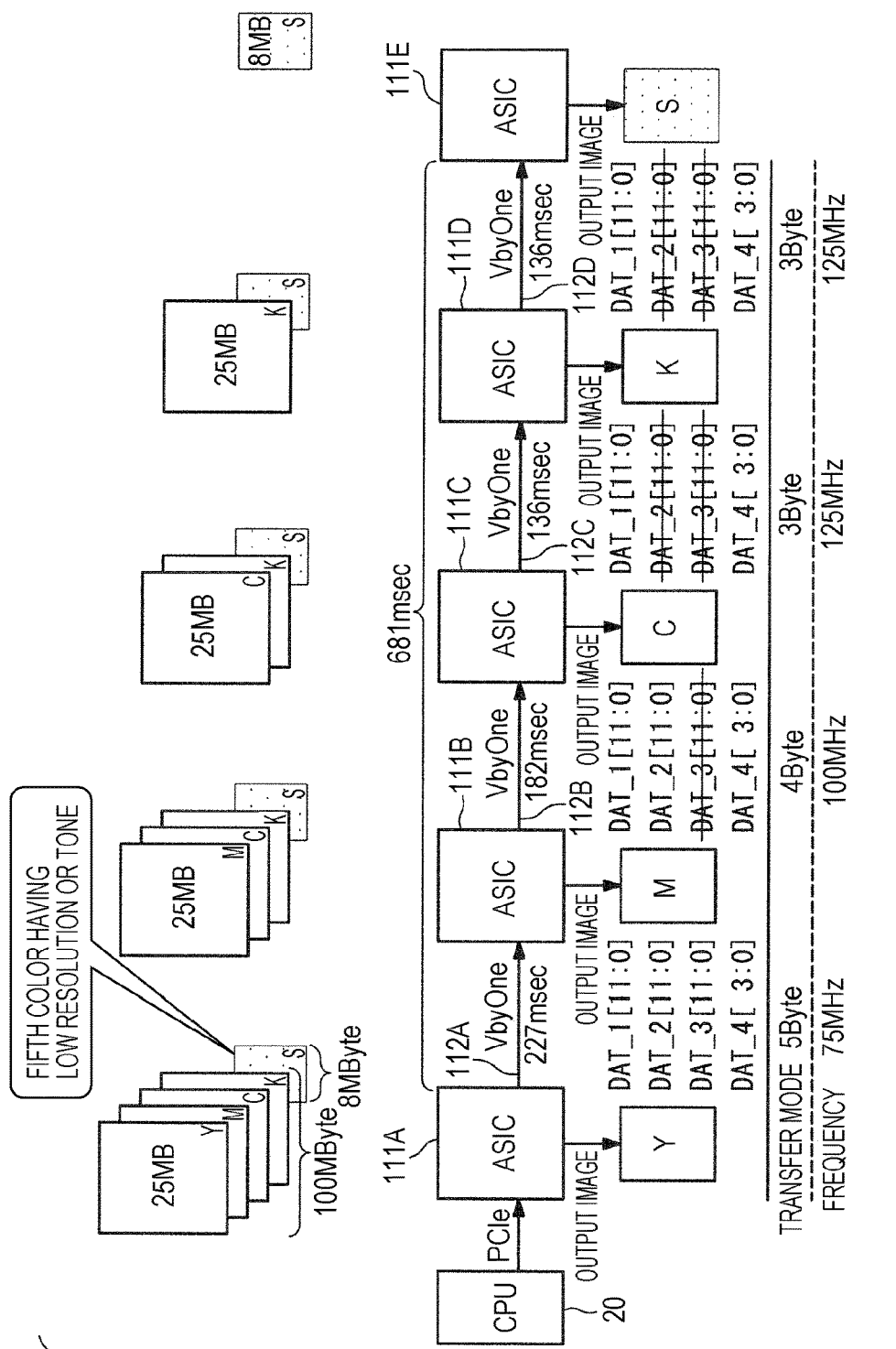
FIG. 7 is a block diagram of an image processing device according to another embodiment (Embodiment 2-2) of the present invention.

In Embodiment 2-2, as illustrated in FIG. 7, the five image processors are cascaded to optimize the transfer mode of VbyOne and the frequency are optimized as in Embodiment 1-2, reducing the transfer time to 681 msec.

In a device configuration, the ASIC 111A, the ASIC 111B, the ASIC 111C, the ASIC 111D, and the ASIC 111E are sequentially connected to the CPU 20 in this order from an upper stage closer to the CPU 20, by the clock-embedded interface including VbyOne, and serial transfer can be performed between the ASICs through the transfer buses 112A, 112B, 112C, and 112D.

The image processing device according to the present embodiment includes, excluding the CPU 20, the ASICs 111A, 111B, 111C, 111D, and 111E, and the transfer buses 112A, 112B, 112C, and 112D.

The ASICs 111A, 111B, 111C, 111D, and 111E correspond to the image processor according to the present invention.

In this embodiment, since three-color image data is only required to be transferred between the second ASIC 111B and the third ASIC 111C, the image bus transfers 32 bits (4 bytes) per clock cycle, and the bus DAT_3 is not used. The image bus extending from the first ASIC 111A to the second ASIC 111B transfers 40 bits per clock cycle, and in the second stage, the number of bytes to be transferred is smaller than that in the transfer of 40 bits. Between the second ASIC 111B and the third ASIC 111C, transfer frequency is 100 MHz.

Since two-color image data is only required to be transferred between the third ASIC 111C and the fourth ASIC 111D, the image bus transfers 24 bits (3 bytes) per clock cycle, and the buses DAT_2 and DAT_3 are not used. The number of bytes to be transferred is smaller than that in the transfer of 40 bits through the image bus extending from the first ASIC 111A to the second ASIC 101B, in the third stage and the fourth stage. Between the third ASIC 111C and the fourth ASIC 111D, transfer frequency is set to 125 MHz.

Furthermore, since single-color image data is only required to be transferred between the fourth ASIC 111D and the fifth ASIC 111E, image bus transfers 24 bits (3 bytes) per clock cycle, and the buses DAT_2 and DAT_3 are not used. The number of bytes to be transferred is smaller than that in the transfer of 40 bits through the image bus extending from the first ASIC 111A to the second ASIC 101B, in the third stage and the fourth stage. Between the fourth ASIC 111D and the fifth ASIC 111E, transfer frequency is set to 125 MHz. The above configuration can reduce the transfer time to 681 msec.

Embodiment 2-3

Figure 8:
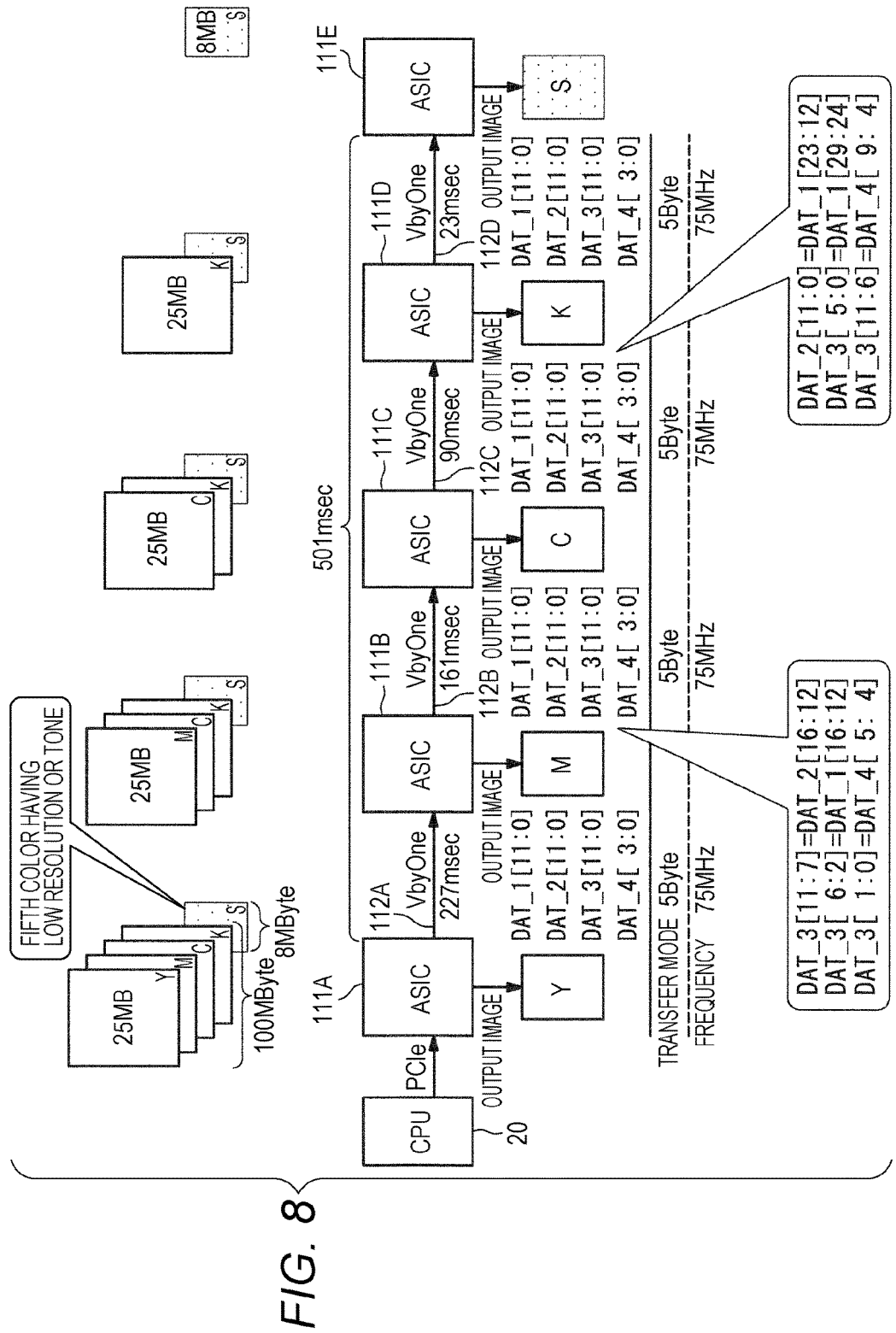
FIG. 8 is a block diagram of an image processing device according to another embodiment (Embodiment 2-3) of the present invention.

In Embodiment 2-3, as illustrated in FIG. 8, the five image processors are cascaded to optimize a bus width.

In this device configuration as well, the ASIC 111A, the ASIC 111B, the ASIC 111C, the ASIC 111D, and the ASIC 111E are connected to the CPU 20 in this order from an upper stage closer to the CPU 20 by the clock-embedded interface including VbyOne, and serial transfer can be performed between the ASICs through the transfer buses 112A, 112B, 112C, and 112D.

Between the ASICs 111A to 111D, four image buses DAT_1, DAT_2, DAT_3, and DAT_4 are provided.

In Embodiment 2-2, when three-color image data is transferred from the second ASIC 111B to the third ASIC 111C, DAT_3 is not used. Therefore, in the present embodiment, DAT_3 is used to expand the image bus to increase a data rate per CLK from 10 bits per color. That is, when two-color image data is transferred from the second ASIC 111B to the third ASIC 111C, the buses DAT_1, DAT_2, and DAT_4 are expanded to provide relationships DAT_3(11:7)=DAT_2(16:12), DAT_3(6:2)=DAT_1(16:12), and DAT_3(1:0)=DAT_4(5:4).

When two-color image data is transferred from the third ASIC 111C to the fourth ASIC 111D, DAT_2 and DAT_3 are used to expand the image bus per CLK. That is, the buses DAT_1, DAT_2, and DAT_4 are expanded to provide relationships DAT_2(11:0)=DAT_2(23:12), DAT_3(5:0)=DAT_1(29:24), and DAT_3(11:6)=DAT_4(9:4). The configuration of the image bus can be optimized to reduce the transfer time to 501 msec. Note that processed image data is output from the respective output ends to the image engine unit.

In the present embodiment, the above configuration can reduce the transfer time to 501 msec.

Embodiment 2-4

Figure 9:
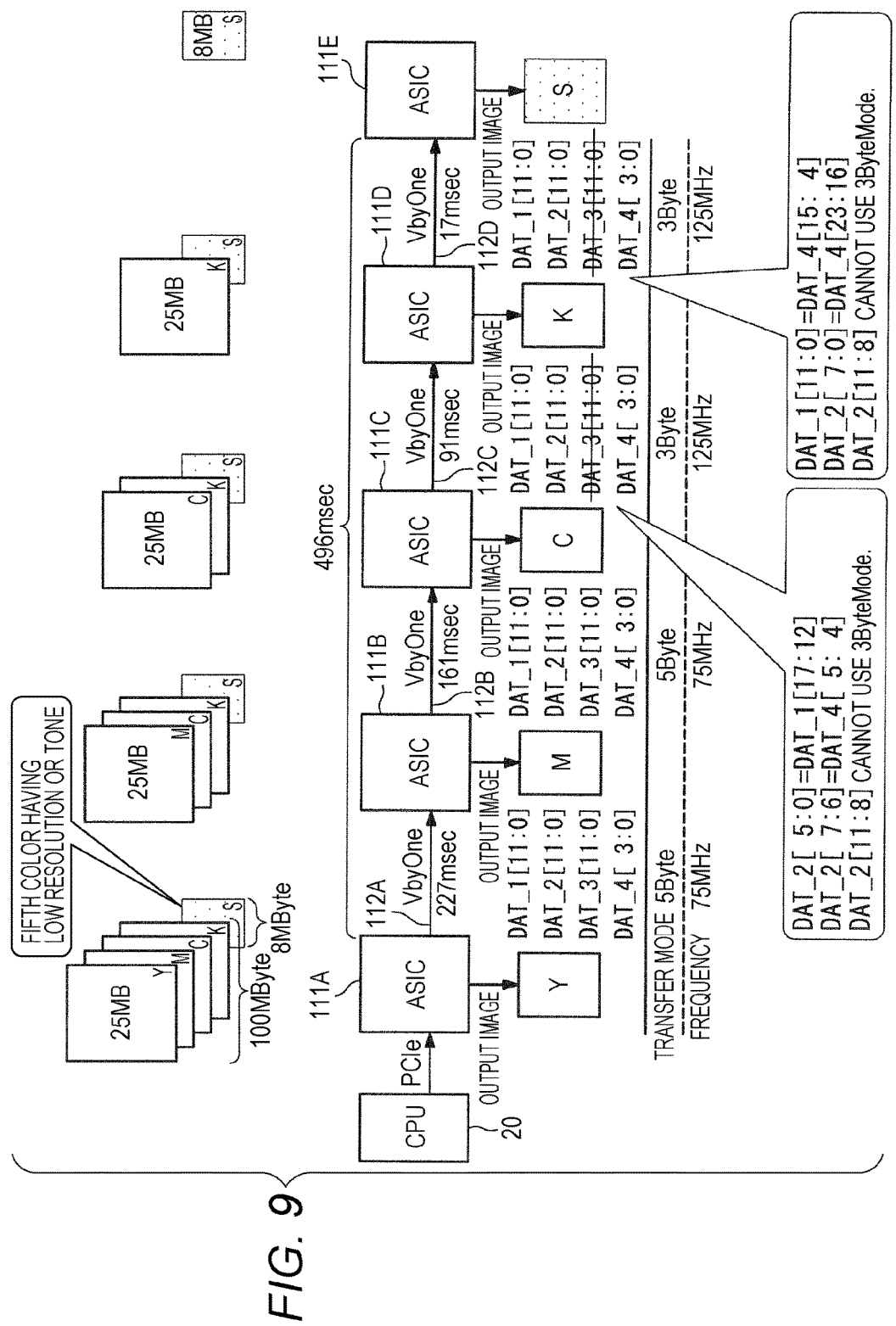
FIG. 9 is a block diagram of an image processing device according to another embodiment (Embodiment 2-4) of the present invention.

In Embodiment 2-4, as illustrated in FIG. 9, Embodiment 2-2 and Embodiment 2-3 can be combined and used to further reduce the transfer time.

In this device configuration as well, the ASIC 111A, the ASIC 111B, the ASIC 111C, the ASIC 111D, and the ASIC 111E are connected to the CPU 20 in this order from an upper stage closer to the CPU 20 by the clock-embedded interface including VbyOne, and serial transfer can be performed between the ASICs through the transfer buses 112A, 112B, 112C, and 112D.

In the present embodiment, between the first ASIC 111A and the second ASIC 111B, and between the second ASIC 111C and the third ASIC 111D, the transfer mode of VbyOne is set to 5 ByteMode. Two-color image data is transferred between the third ASIC 111C and the fourth ASIC 111D, single-color image data is transferred between the fourth ASIC 111D and the fifth ASIC 111E, and DAT_3 is not used for them. Therefore, between the third ASIC 111C and fourth ASIC 111D, and between the fourth ASIC 111D and the fifth ASIC 111E, the number of bytes to be transferred is set to 3 bytes, and the transfer frequency is set to 125 MHz. Furthermore, when image data is transferred between the third ASIC 111C and the fourth ASIC 111D, DAT_1 and DAT_4 are expanded, and when image data is transferred between the fourth ASIC 111D and the fifth ASIC 111E, DAT_4 is expanded.

In the present embodiment, the above configuration can reduce the transfer time to 496 msec. In each of the ASICs 111A to 111E, as in the embodiments described above, processed image data is output from an output end to the image engine unit.

Embodiment 3-1

Figure 10:
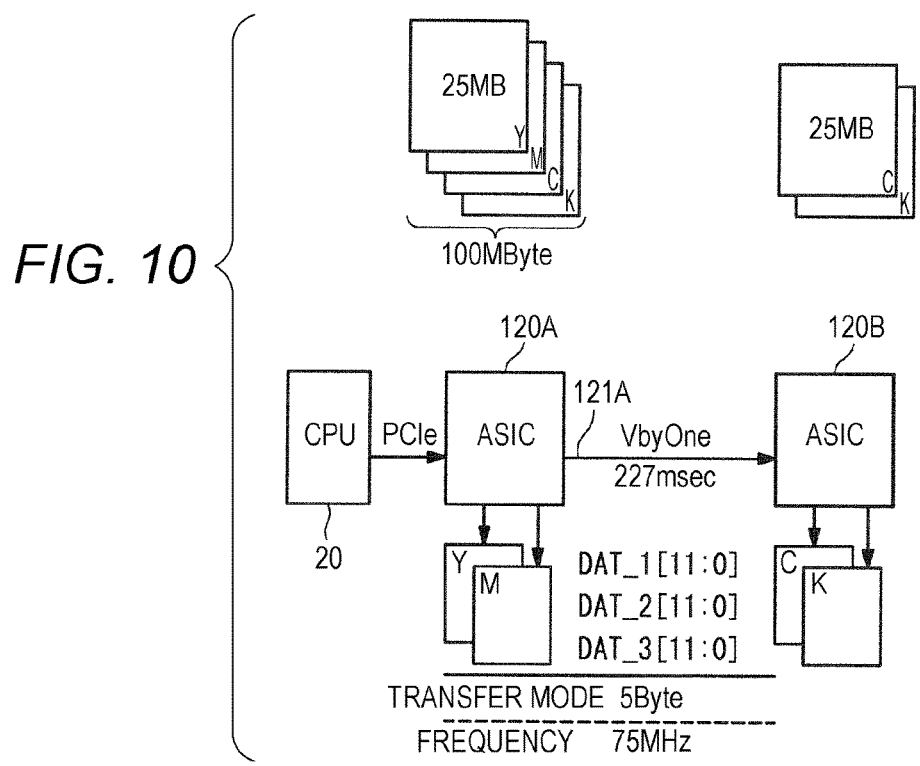
FIG. 10 is a block diagram of an image processing device according to another embodiment (Embodiment 3-1) of the present invention.

In Embodiment 3-1, as illustrated in FIG. 10, a connection example is described where one output image processor can output two color images.

In this embodiment, an ASIC 120A and an ASIC 120B are connected to the CPU 20 in this order from an upper stage closer to the CPU 20 by the clock-embedded interface including VbyOne, and serial transfer can be performed through a transfer bus 121A.

In this embodiment, two-color image data of four-color image data transmitted from the CPU 20 is processed by the first ASIC 120A, the processed two-color image data is output from output ends, and unprocessed two-color image data is transferred from the first ASIC 120A to the second ASIC 120B through the transfer bus 121A. A transfer mode is set to transfer 20 bits per color, and the transfer frequency is set to 75 MHz. Accordingly, in Embodiment 3-1, the transfer time is 227 msec. Note that in each of the ASIC 120A and 120B, processed image data is output from the output ends to the image engine unit.

Embodiment 3-2

Figure 11:
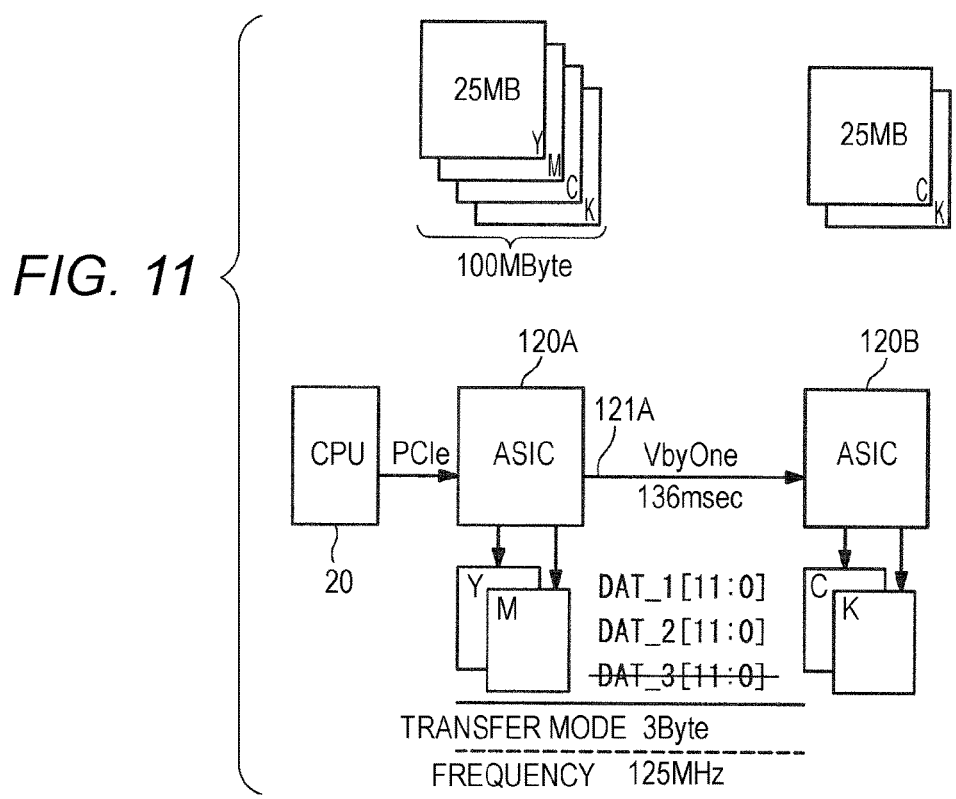
FIG. 11 is a block diagram of an image processing device according to another embodiment (Embodiment 3-2) of the present invention.

In Embodiment 3-2, as illustrated in FIG. 11, a connection example is described where one output image processor can output two color images, and the transfer mode of VbyOne is changed to reduce the transfer time.

In this embodiment, the ASIC 120A and the ASIC 120B are connected to the CPU 20 in this order from an upper stage closer to the CPU 20 by the clock-embedded interface including VbyOne, and serial transfer can be performed through the transfer bus 121A.

In this embodiment, since two-color image data is only required to be transferred between the first ASIC 120A and the second ASIC 120B, DAT_3 is not used, and the image bus transfers 24 bits per clock cycle, and the transfer frequency is set to 125 MHz.

In the present embodiment, the above configuration can reduce the transfer time to 136 msec. Note that in each of the ASICs 120A and 120B, as in the embodiments described above, processed image data is output from output ends to the image engine unit.

Embodiment 3-3

Figure 12:
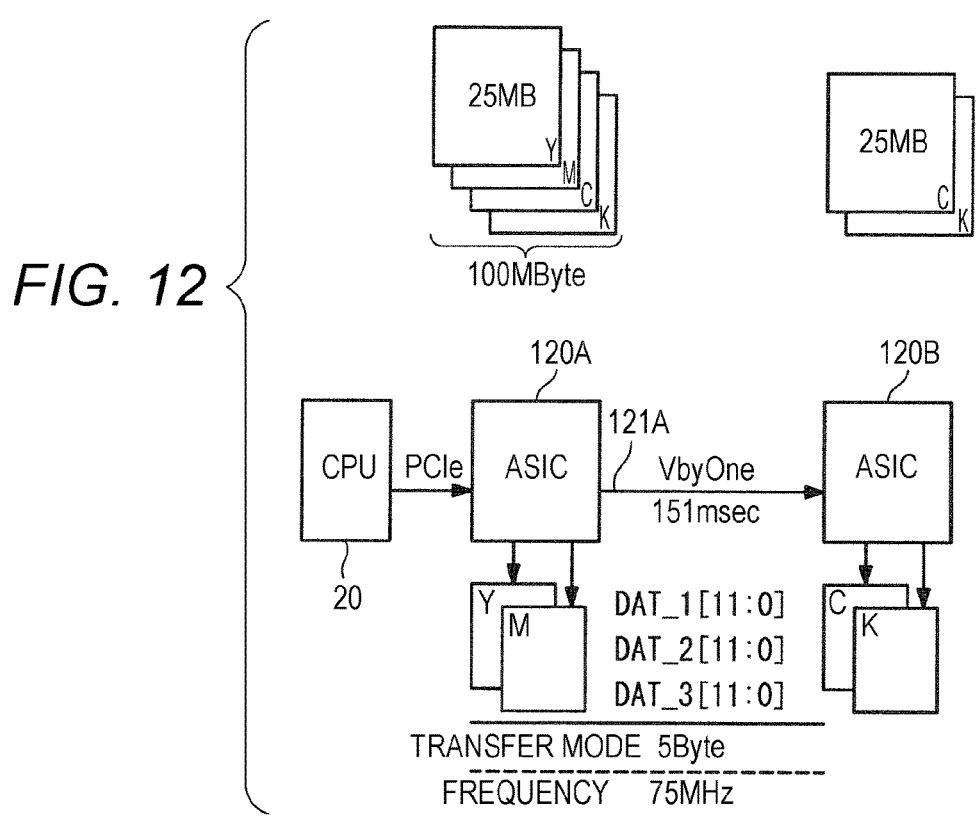
FIG. 12 is a block diagram of an image processing device according to another embodiment (Embodiment 3-3) of the present invention.

In Embodiment 3-3, as illustrated in FIG. 12, a connection example is described where one output image processor can output two color images, and an unused image bus (unused bus) is used to reduce the transfer time.

In this embodiment, the ASIC 120A and the ASIC 120B are connected to the CPU 20 in this order from an upper stage closer to the CPU 20 by the clock-embedded interface including VbyOne, and serial transfer can be performed through the transfer bus 121A.

Between the ASIC 120A and 120B, the three image buses DAT_1, DAT_2, and DAT_3 are provided. In Embodiment 3-2, when two-color image data is transferred from the first ASIC 120A to the second ASIC 120B, DAT_3 is not used.

In this embodiment, DAT_3 is used to expand the image bus to increase a data rate per CLK from 12 bits per color to 20 bits per color. That is, when two-color image data is transferred from the first ASIC 120A to the second ASIC 120B, the buses DAT_1 and DAT_2 are expanded to DAT_3.

The transfer mode and the configuration of the image bus can be optimized to reduce the transfer time to 151 msec. Note that in each of the ASICs 120A and 120B, as in the embodiments described above, processed image data is output from output ends to the image engine unit.

Embodiment 4-1

Figure 13:
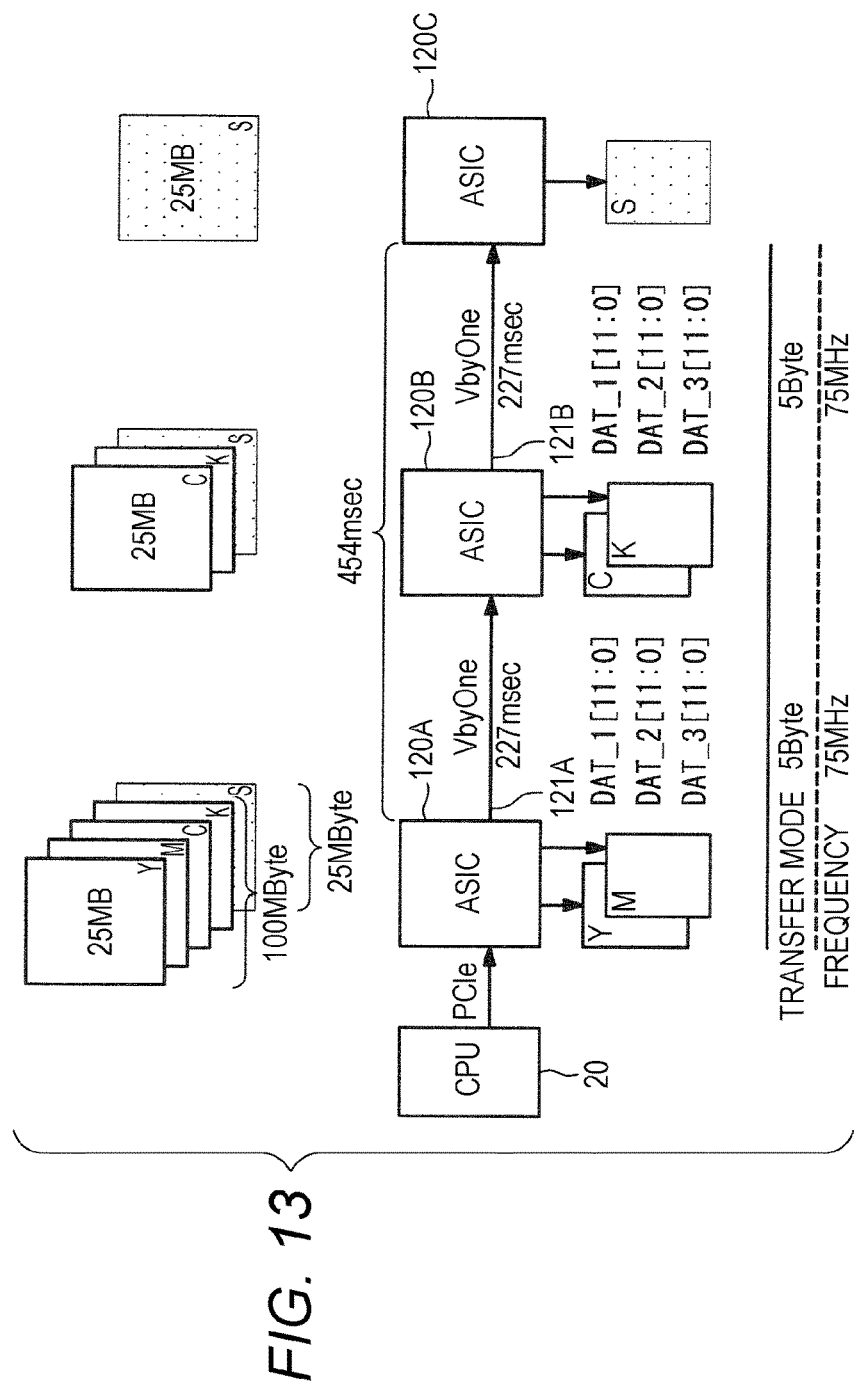
FIG. 13 is a block diagram of an image processing device according to another embodiment (Embodiment 4-1) of the present invention.

In Embodiment 4-1, as illustrated in FIG. 13, a connection example is described where one output image processor can output two color images, and three image processors are cascaded to output an image having a fifth color from the third image processor. Unlike Embodiments 2-1 to 2-4, the image having a fifth color has a resolution and a tone which are the same as those of CMYK.

Specifically, the image processing device includes the ASIC 120A, the ASIC 120B, and the ASIC 120C which are connected in this order from an upper stage closer to the CPU 20 by the clock-embedded interface including VbyOne, and serial transfer can be performed through the transfer buses 121A and 121B.

In the first ASIC 120A, five-color image data is input and two-color image data is subjected to image processing. The remaining three-color image data is transferred from the ASIC 120A to the second ASIC 120B through the image bus 121A. In the ASIC 120B, the three-color image data is input and two-color image data is subjected to image processing. The remaining single-color image data is transferred from the ASIC 120B to the third ASIC 120C through the image bus 121B.

As described above, since image data of up to three colors are transferred between the ASICs, the image bus is 40 bits. Since the transfer mode of VbyOne is a 5 ByteMode, the upper limit of transfer frequency is 75 MHz. In each of the ASICs 120A and 120B, processed two-color image data is output from output ends to the image engine unit, and in the ASIC 120C, processed single-color image data is from an output end to the image engine unit.

In Embodiment 4-1, images to be transferred are restricted to only images of colors necessary to downstream devices, but the image bus transfers data without changing assignment of 12 bits per color, and the transfer time is reduced to 454 msec.

Embodiment 4-2

Figure 14:
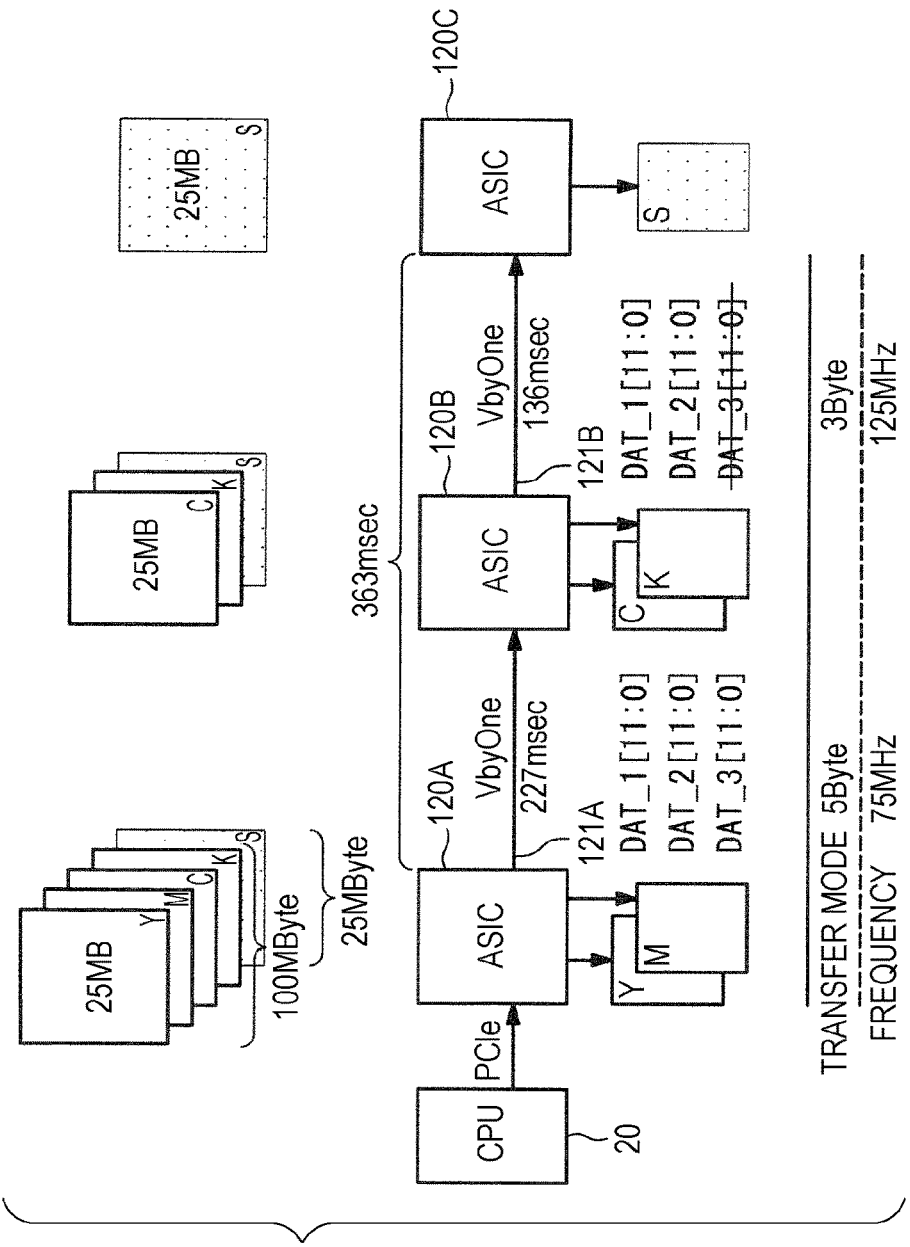
FIG. 14 is a block diagram of an image processing device according to another embodiment (Embodiment 4-2) of the present invention.

In Embodiment 4-2, as illustrated in FIG. 14, a connection example is described where one output image processor can output two color images, three image processors are cascaded to output an image having a fifth color from the third image processor, and the transfer mode of VbyOne is changed to reduce the transfer time. In Embodiment 4-2 as well, unlike Embodiments 2-1 to 2-4, the image having a fifth color has a resolution and a tone which are the same as those of CMYK.

The image processing device includes the ASIC 120A, the ASIC 120B, and the ASIC 120C which are connected in this order from an upper stage closer to the CPU 20 by the clock-embedded interface including VbyOne, and serial transfer can be performed through the transfer buses 121A and 121B.

Since two-color image data is only required to be transferred from the second ASIC 120B to the third ASIC 120C, DAT_3 is not used, and the image bus transfers 24 bits per clock cycle. The image bus extending from the first ASIC 120A to the second ASIC 120B transfers 40 bits per clock cycle, and in the second stage, the number of bytes to be transferred is smaller than that in the transfer of 40 bits.

Furthermore, 3 ByteMode can be selected for the transfer mode of VbyOne, and the upper limit frequency is 125 MHz. From the first ASIC 120A to the second ASIC 120B, transfer is performed at a transfer frequency of 75 MHz, but from the second ASIC 120B to the third ASIC 120C, the transfer frequency of VbyOne is increased to 125 MHz.

In the present embodiment, the above configuration can reduce the transfer time to 363 msec. Note that, as in the embodiment described above, in each of the ASICs 120A and 120B, processed two-color image data is output from output ends to the image engine unit, and in the ASIC 120C, processed single-color image data is output from an output end to the image engine unit.

Embodiment 4-3

Figure 15:
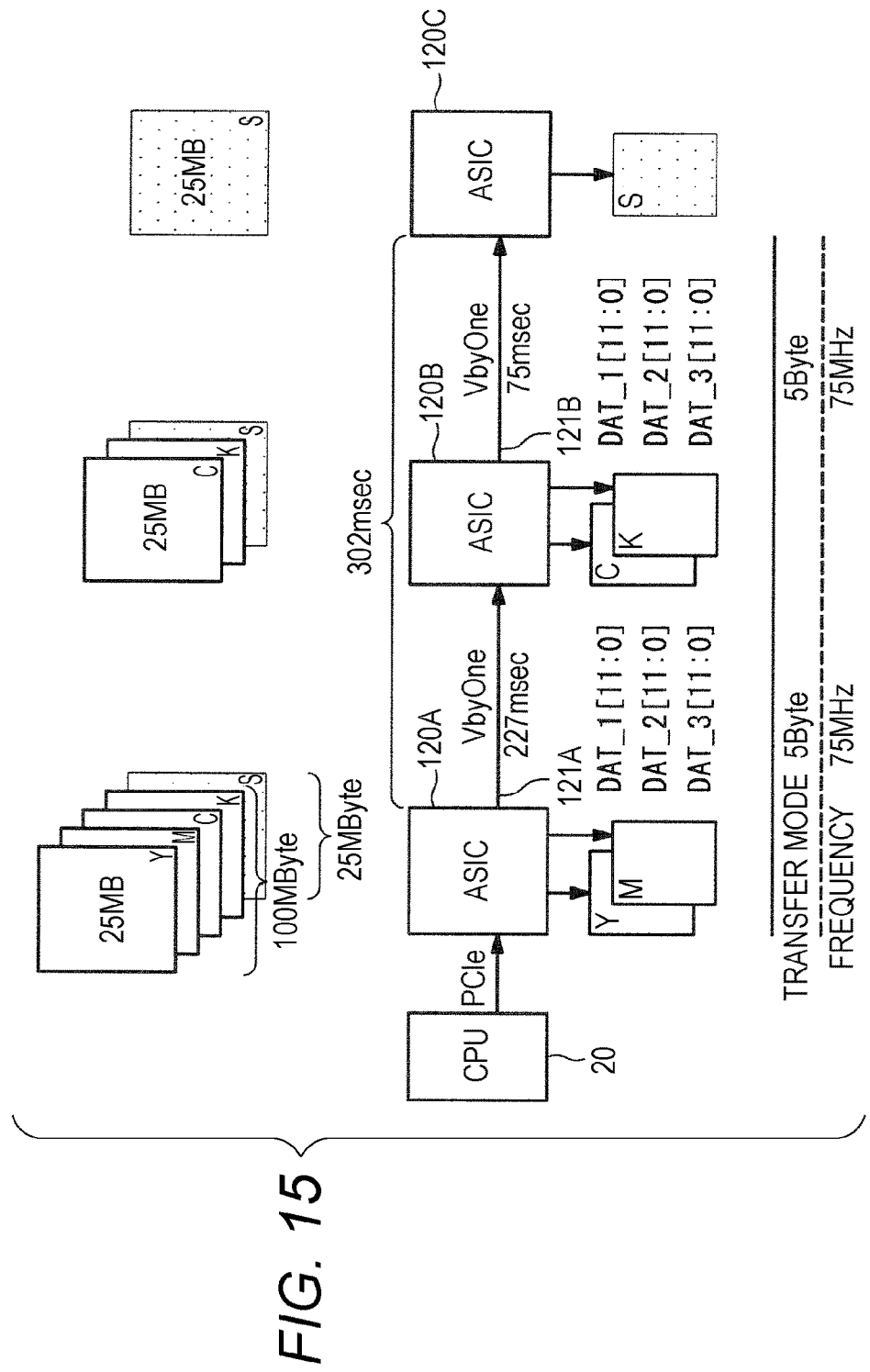
FIG. 15 is a block diagram of an image processing device according to another embodiment (Embodiment 4-3) of the present invention.

In Embodiment 4-3, as illustrated in FIG. 15, a connection example is described where one output image processor can output two color images, three image processors are cascaded to output an image having a fifth color from the third image processor, and an unused image bus (unused bus) is used to reduce the transfer time. In Embodiment 4-3 as well, unlike Embodiments 2-1 to 2-4, the image having a fifth color has a resolution and a tone which are the same as those of CMYK. Furthermore, unlike Embodiment 4-2, the transfer mode of VbyOne is not changed (the same as that in Embodiment 4-1).

The image processing device includes the ASIC 120A, the ASIC 120B, and the ASIC 120C which are connected in this order from an upper stage closer to the CPU 20 by the clock-embedded interface including VbyOne, and serial transfer can be performed through the transfer buses 121A and 121B.

Between the ASIC 120A and 120B, the three image buses DAT_1, DAT_2, and DAT_3 are provided. In Embodiment 4-2, when two-color image data is transferred from the second ASIC 120B to the third ASIC 120C, DAT_3 is not used. In the present embodiment, DAT_3 is used to expand the image bus per CLK. That is, when two-color image data is transferred from the second ASIC 120B to the third ASIC 120C, the buses DAT_1 and DAT_2 are expanded to DAT_3.

The configuration of the image bus can be optimized to reduce the transfer time to 302 msec. Note that, as in the embodiments described above, in each of the ASICs 120A and 120B, processed two-color image data is output from output ends to the image engine unit, and in the ASIC 120C, processed single-color image data is output from an output end to the image engine unit.

Embodiment 4-4

Figure 16:
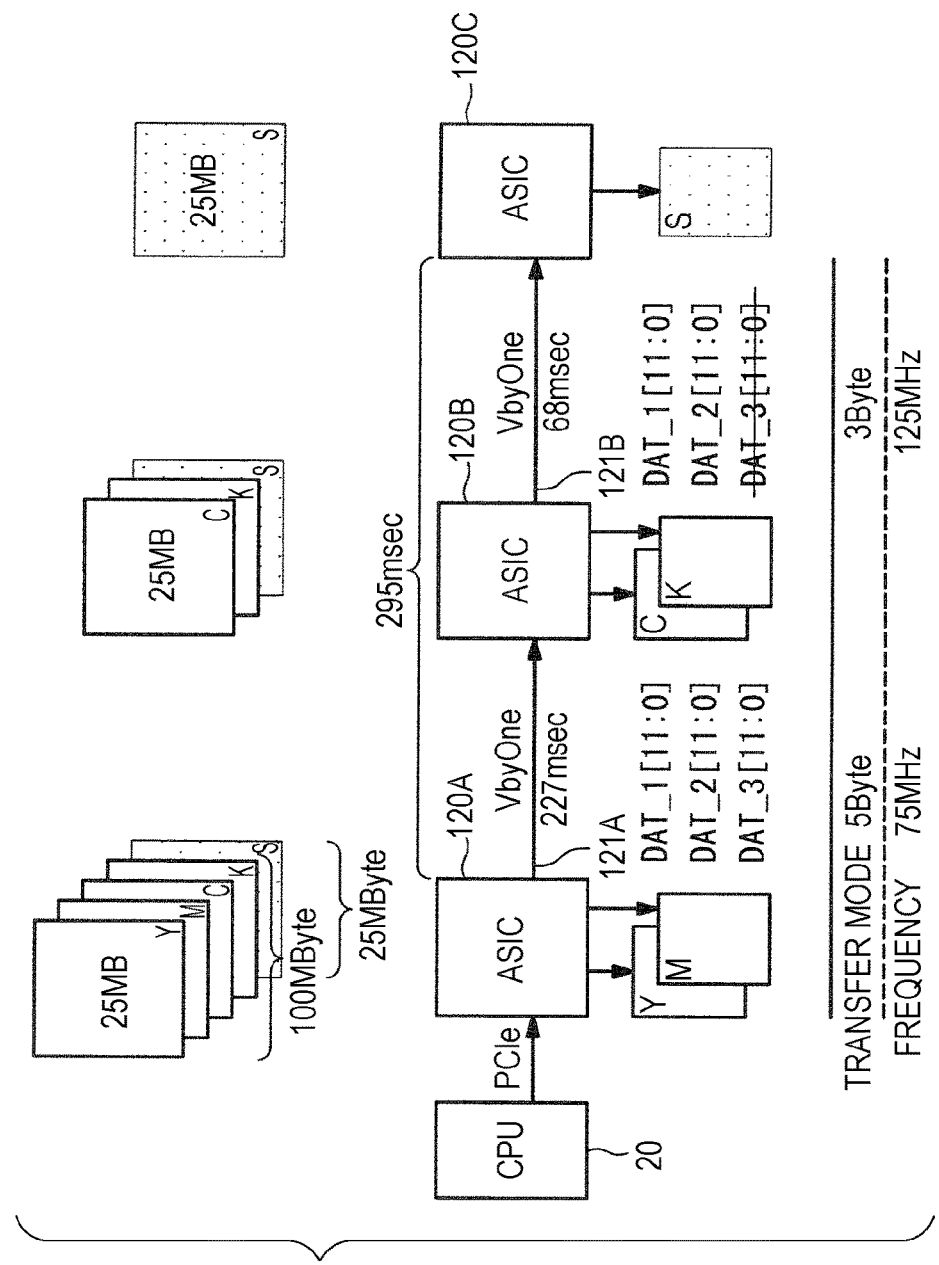
FIG. 16 is a block diagram of an image processing device according to another embodiment (Embodiment 4-4) of the present invention.

In Embodiment 4-4, as illustrated in FIG. 16, a connection example is described where one output image processor can output two color images, three image processors are cascaded to output an image having a fifth color from the third image processor, and Embodiment 4-2 and Embodiment 4-3 can be combined and used to further reduce the transfer time.

The image processing device includes the ASIC 120A, the ASIC 120B, and the ASIC 120C which are connected in this order from an upper stage closer to the CPU 20 by the clock-embedded interface including VbyOne, and serial transfer can be performed through the transfer buses 121A and 121B.

Between the first ASIC 120A and the second ASIC 120B, the transfer mode of VbyOne is set to 5 ByteMode, and between the second ASIC 120B and the third ASIC 120C, the transfer mode of VbyOne is set to 3 ByteMode. Between the second ASIC 120B and the third ASIC 120C, transfer frequency is set to 125 MHz.

In the present embodiment, the above configuration can reduce the transfer time to 295 msec. Note that, as in the embodiments described above, in each of the ASICs 120A and 120B, processed two-color image data is output from output ends to the image engine unit, and in the ASIC 120C, processed single-color image data is output from an output end to the image engine unit.

According to an embodiment of the present invention, when image processors are cascaded, only image data to be output in a lower stage is transferred, and an amount of images to be transferred decreases toward the downstream side, a time required to transfer images to the most downstream device can be reduced, achieving efficient transfer.

Although embodiments of the present invention have been described and illustrated in detail, it is clearly understood that the same is by way of illustration and example only and not limitation, the scope of the present invention should be interpreted by terms of the appended claims Appropriate modifications can be made to the above embodiments without departing from the scope of the present invention.

What is claimed is:

1. An image processing device comprising
a plurality of image processors cascaded into a plurality of stages, each one of the image processors configured to perform image processing to generate output image data and configured to send the output image data to a device other than the image processors,
wherein the plurality of stages includes a first stage and a second stage after the first stage, the plurality of image processors includes a first image processor at the first stage and a second image processor at the second stage, and
wherein the first image processor is configured to receive image data input, perform image processing on a portion of the received image data input to generate output image data, and transfer data to the second image processor having a total amount in bytes that is less than that of the received image data input, wherein the transferred data does not include the portion of the received image data input on which image processing was performed by the first image processor, and the transferred data includes other portions of the received image data input.

2. The image processing device according to claim 1, wherein
the second image processor is configured such that it receives the other portions of the image data input which were received from the first image processor and does not receive the portion of the image data input on which image processing was performed by the first image processor, and
the second image processor is configured to perform image processing on the other portions of the image data input to generate output image data.

3. The image processing device according to claim 1, wherein
the image data input to the first image processor includes a plurality of kinds of image data, the plurality of kinds includes a first kind of image data and a second kind of image data, and the first image processor is configured to perform image processing on the first kind of image data and transfer image data to the second image processor, wherein the transferred data includes the second kind of image data and does not include the first kind of image data.

4. The image processing device according to claim 3, wherein
the first kind of image data represents a first color, and the second kind of image data represents a second color.

5. The image processing device according to claim 1, wherein
each one of the plurality of image processors is an ASIC.

6. The image processing device according to claim 5, wherein
the ASICs have the same kind of configuration.

7. The image processing device according to claim 1, wherein
the first image processor enables changing a transfer mode for transferring data to the second image processor.

8. The image processing device according to claim 7, wherein
the changing of a transfer mode includes changing a transfer frequency and the number of bytes to be transferred.

9. The image processing device according to claim 1, wherein
a first transfer frequency is used in the transferring of data from the first image processor to the second image processor,
the plurality of stages includes a third stage after the second stage, the plurality of image processors includes a third image processor at the third stage,
the second image processor is configured to transfer data to the third image processor having a total amount in bytes that is less than that of the data received by the second image processor from the first image processor,
a second transfer frequency is used in the transferring of data from the second image processor to the third image processor, the second transfer frequency being greater than the first transfer frequency.

10. The image processing device according to claim 3, wherein
each one of the plurality of image processors communicates with another one of the plurality of image processors via respective sets of data buses, each set of data buses includes a first bus and a second bus,
the first image processor receives the first kind of image data via a first bus and receives the second kind of image data via a second bus, said first and second buses belonging to one set of data buses, and
the first image processor transfers the second kind of image data to the second image processor via a first bus and a second bus that belong to another set of data buses.

11. The image processing device according to claim 1, wherein
there is a clock-embedded interface between the image processors.

12. The image processing device according to claim 1, wherein transfer of data through the plurality of stages is performed through serial communication among the image processors.

13. The image processing device according to claim 1, wherein
the image processing device performs preprocessing of image data for an image former forming an image on a transfer medium.

14. The image processing device according to claim 1, wherein
the image processing device performs preprocessing of image data for image display on a display.

15. An image forming apparatus comprising:
the image processing device according to claim 1; and
an image former configured to form an image on a transfer medium based on the generated image data outputted by each one of the image processors.

16. An image display device comprising:
the image processing device according to claim 1; and
a display configured to display an image based on the generated image data outputted by each one of the image processors.

17. The image processing device of claim 1, wherein the first stage is a stage that begins the plurality of stages.

18. The image processing device of claim 1, wherein the first stage is a stage between a stage that begins the plurality of stages and a stage that ends the plurality of stages.

19. The image processing device of claim 18, wherein the second stage is the stage that ends the plurality of stages.

20. A non-transitory recording medium storing a computer readable program causing a computer to function as
an image processing device comprising a plurality of image processors cascaded into a plurality of stages, each one of the image processors performing image processing to generate output image data and then sending the output image data to a device other than the image processors,
wherein the plurality of stages includes a first stage and a second stage after the first stage, the plurality of image processors includes a first image processor at the first stage and a second image processor at the second stage, and
wherein the first image processor receives image data input, performs image processing on a portion of the received image data input to generate output image data, and transfers data to the second image processor having a total amount in bytes that is less than that of the received image data input, wherein the transferred data does not include the portion of the received image data input on which image processing was performed by the first image processor, and the transferred data includes other portions of the received image data input.

* * * * *